(12) United States Patent
Sun et al.

(10) Patent No.: US 12,730,530 B2
(45) Date of Patent: Sep. 8, 2026

(54) DISPLAY PANEL WHEREIN TOUCH SIGNAL LEADS ARE DISPOSED ON A DIFFERENT SIDE THAN DATA SIGNAL LEADS

(71) Applicants: Chengdu BOE Optoelectronics Technology Co., Ltd., Chengdu (CN); BOE Technology Group Co., Ltd., Beijing (CN)

(72) Inventors: Hao Sun, Beijing (CN); Ren Xiong, Beijing (CN); Zhenwen Hu, Beijing (CN); Liang Gao, Beijing (CN); Ajuan Du, Beijing (CN); Feifan Li, Beijing (CN); Hufei Yang, Beijing (CN); Yongle Wang, Beijing (CN); Enjian Yang, Beijing (CN); Yilun Zeng, Beijing (CN); Guodong Zeng, Beijing (CN); Yiqian Wu, Beijing (CN); Yunhui Huang, Beijing (CN); Wei Chen, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/024,897

(22) PCT Filed: Jun. 2, 2022

(86) PCT No.: PCT/CN2022/096815

§ 371 (c)(1),
(2) Date: Mar. 6, 2023

(87) PCT Pub. No.: WO2023/230982

PCT Pub. Date: Dec. 7, 2023

(65) Prior Publication Data

US 2025/0093992 A1 Mar. 20, 2025

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05)

(58) Field of Classification Search
CPC ........................... G06F 3/04164; G06F 3/0446
See application file for complete search history.

(56) References Cited

U.S. PATENT DOCUMENTS

2018/0343741 A1* 11/2018 Williams ............... H05K 3/027
2019/0302934 A1* 10/2019 Rhe ......................... G06F 3/047
(Continued)

FOREIGN PATENT DOCUMENTS

CN 206178744 U 5/2017
CN 206258843 U 6/2017
(Continued)

*Primary Examiner* — Nathan P Brittingham
(74) *Attorney, Agent, or Firm* — IPro, PLLC

(57) ABSTRACT

Provided is a display panel. The display panel is divided into a display region and a non-display region disposed on a periphery of the display region. The display panel includes: a plurality of touch units and a plurality of light-emitting devices that are within the display region; and a plurality of touch signal leads and a plurality of data signal leads that are within the non-display region, wherein the touch signal lead is electrically connected to the touch unit, and the data signal lead is electrically connected to the light-emitting device; wherein in the non-display region, a region where at least a portion of the touch signal leads are disposed and a region where the plurality of data signal leads are disposed are respectively on different sides of the display region.

19 Claims, 5 Drawing Sheets

(56) References Cited

U.S. PATENT DOCUMENTS

| | | | | |
|---|---|---|---|---|
| 2020/0089351 | A1* | 3/2020 | Jeong | G06F 3/044 |
| 2020/0393924 | A1 | 12/2020 | Li et al. | |
| 2022/0028951 | A1 | 1/2022 | Xu et al. | |
| 2022/0246880 | A1* | 8/2022 | Jeong | H10K 59/873 |
| 2022/0366837 | A1* | 11/2022 | Zou | G09G 3/006 |
| 2023/0205357 | A1* | 6/2023 | Yoo | G06F 3/0446<br>345/173 |

FOREIGN PATENT DOCUMENTS

| | | | | |
|---|---|---|---|---|
| CN | 111624797 | A | | 9/2020 |
| CN | 212647220 | U | | 3/2021 |
| CN | 215910881 | U | * | 2/2022 |
| JP | H11153806 | A | | 6/1999 |

* cited by examiner

DISPLAY PANEL WHEREIN TOUCH SIGNAL LEADS ARE DISPOSED ON A DIFFERENT SIDE THAN DATA SIGNAL LEADS

CROSS-REFERENCE TO RELATED APPLICATION

The present disclosure is a U.S. national stage of international application No. PCT/CN2022/096815, filed on Jun. 2, 2022, the content of which is herein incorporated by reference in its entirety.

TECHNICAL FIELD

The present disclosure relates to the technical field of displays, and in particular, relates to a display panel and a display device.

BACKGROUND OF THE INVENTION

With the development of display technologies, display devices become more and more widely used. The display devices are commonly used in products with display functions, such as smartphones, tablet computers, digital cameras, aircraft instruments, and televisions.

SUMMARY OF THE INVENTION

Embodiments of the present disclosure provide a display panel and a display device. The technical solutions are as follows.

According to one aspect of the embodiments of the present disclosure, a display panel is provided. The display panel is divided into a display region and a non-display region disposed on a periphery of the display region, wherein the display panel includes:

- a plurality of touch units and a plurality of light-emitting devices that are within the display region; and
- a plurality of touch signal leads and a plurality of data signal leads that are within the non-display region, wherein the touch signal lead is electrically connected to the touch unit, and the data signal lead is electrically connected to the light-emitting device;
- wherein in the non-display region, a region where at least a portion of the touch signal leads are disposed and a region where the plurality of data signal leads are disposed are respectively on different sides of the display region.

In some embodiments, the plurality of touch signal leads include: a first lead group and a second lead group, wherein both the first lead group and the second lead group include at least two of the touch signal leads;

- wherein in the non-display region, a region where the first lead group is disposed and a region where the second lead group is disposed are respectively on a first side and a second side of the display region.

In some embodiments, the first side of the display region and the second side of the display region are opposite to each other; and

- the region, where the plurality of data signal leads are disposed, in the non-display region is on a third side of the display region, the third side being between the first side and the second side.

In some embodiments, the plurality of touch signal leads further include: a third lead group, the third lead group including at least two of the touch signal leads;

- wherein a region, where the third lead group is disposed, in the non-display region is on a fourth side of the display region, the fourth side being opposite to the third side.

In some embodiments, the touch unit includes: a touch drive electrode and a touch sensing electrode that are insulated from each other;

- wherein a portion of the plurality of touch signal leads are first sub-leads configured to be electrically connected to the touch drive electrodes, and another portion of the plurality of touch signal leads are second sub-leads configured to be electrically connected to the touch sensing electrodes.

In some embodiments, the display panel further includes: a touch drive signal line electrically connected to the touch drive electrode and the first sub-lead and a touch sensing signal line electrically connected to the touch sensing electrode and the second sub-lead; wherein

- one portion of the touch drive signal lines are within a region, proximal to the first side, in the non-display region, and the other portion of the touch drive signal lines are within a region, proximal to the second side, in the non-display region;
- each of at least a portion of the touch sensing signal lines includes a first line segment and a second line segment that are electrically connected to each other, wherein the first line segment is within a region, proximal to the third side, in the non-display region, and the second line segment is within the region, proximal to the first side or the second side, in the non-display region; and
- both the first lead group and the second lead group include: the first sub-lead and the second sub-lead.

In some embodiments, in a case that the plurality of touch signal leads include the first lead group, the second lead group, and the third lead group, in the touch sensing signal lines, each of one portion of the touch sensing signal lines includes the first line segment and the second line segment, and the other portion of the touch sensing signal lines are within a region, proximal to the fourth side, in the display region;

- wherein each of the touch signal leads in the third lead group is the second sub-lead.

In some embodiments, the display panel further includes: a substrate, wherein the light-emitting device and the touch unit are disposed on the substrate, and the substrate includes a first protrusion for deploying the touch signal lead, the first protrusion including a first bendable region;

- wherein in a case that a portion, within the first bendable region, of the first protrusion is bent, a portion of the first protrusion is on a side, distal from the light-emitting device, of the substrate.

In some embodiments, a portion, within the non-display region, of the substrate includes a hollowed-out structure, wherein at least a portion of the first bendable region is within the hollowed-out structure.

In some embodiments, in the case that the portion, within the first bendable region, of the first protrusion is bent, the first protrusion is entirely within the hollowed-out structure.

In some embodiments, the display panel further includes: a first pad group within the first protrusion, wherein the first pad group is on a side, distal from the display region, of the first bendable region, and pads in the first pad group are electrically connected to the touch signal leads within the first protrusion.

In some embodiments, the substrate further includes a second protrusion for deploying the data signal lead, wherein the second protrusion includes a second bendable region;

wherein in a case that a portion, within the second bendable region, of the second protrusion is bent, a portion of the second protrusion is on the side, distal from the light-emitting device, of the substrate.

In some embodiments, the display panel further includes: a second pad group and a third pad group that are within the second protrusion, wherein both the second pad group and the third pad group are disposed on a side, distal from the display region, of the second bendable region, and the second pad group is more proximal to the display region relative to the third pad group;

wherein pads in the second pad group are electrically connected to the data signal leads within the second protrusion, and the pads in the second pad group are electrically connected to pads in the third pad group.

In some embodiments, the display panel further includes: a package layer disposed on the substrate, wherein the plurality of light-emitting devices are disposed on a side, proximal to the substrate, of the package layer, and the plurality of touch units are disposed on a side, distal from the substrate, of the package layer.

According to another aspect of the embodiments of the present disclosure, a display device is provided. The display device includes a power supply component and the display panel as described above, wherein the power supply component is configured to supply power to the display panel.

BRIEF DESCRIPTION OF DRAWINGS

For clearer descriptions of the technical solutions in the embodiments of the present disclosure, the accompanying drawings required for the descriptions of the embodiments are briefly introduced hereinafter. Apparently, the accompanying drawings in the following description show merely some embodiments of the present disclosure, and persons of ordinary skills in the art may still derive other drawings from these accompanying drawings without creative efforts.

DETAILED DESCRIPTION

A display device typically includes a display panel and a drive circuit board. The display panel is divided into a display region and a non-display region. The display panel includes: a plurality of light-emitting devices and a plurality of data signal lines that are disposed in the display region, and a plurality of data line leads disposed in the non-display region. The plurality of data line leads are electrically connected to the drive circuit board. Each of the data signal lines is electrically connected to a row of light-emitting devices, and an end of each of the data signal lines is electrically connected to one of the data line leads. In this way, the drive circuit board transmits drive signals to the data signal lines over the data line leads, such that the display panel displays corresponding images.

However, conventionally, a width of the non-display region in the display panel is large. Therefore, the width of the non-display region of the display panel needs to be further optimized.

The present disclosure is described in further detail with reference to the accompanying drawings, to clearly present the objects, technical solutions, and advantages of the present disclosure.

Figure 1:
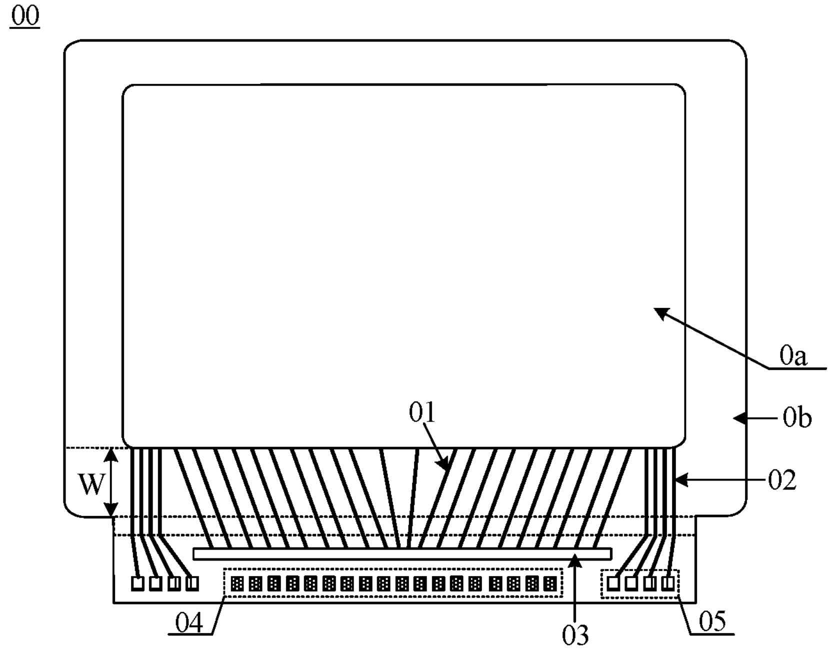
FIG. 1 is a schematic diagram of a display panel according to some practices.

FIG. 1 is a schematic diagram of a display panel according to some practices. Referring to FIG. 1, in some practices, a display panel 00 includes a display region 0*a* and a non-display region 0*b* disposed on a periphery of the display region 0*a*. The display region 0*a* of the display panel 00 is provided with a plurality of touch units (not illustrated in FIG. 1) and a plurality of light-emitting devices (not illustrated in FIG. 1).

The display region 0*b* of the display panel 00 includes a plurality of data signal leads 01, a plurality of touch signal leads 02, a first pad group 03, and a second pad group 04. The first pad group 03 is more proximal to the display region 0*b* than the second pad group 04. Pads in the first pad group 03 are electrically connected to pads in the second pad group 04 by connection lines. One end of the data signal lead 01 is electrically connected to the light-emitting device within the display region 0*a*, and the other end of the data signal lead 01 is electrically connected to the pad in the first pad group 03. The first pad group 03 herein is configured to be electrically connected to a drive chip, and the second pad group 04 herein is configured to be electrically connected to a flexible circuit board. In this way, in the case that the drive chip is bonded to the first pad group 03, the drive chip applies electrical signals to the light-emitting device within the display region 0*b* via the first pad group 03 and the data signal lead 01, such that the light-emitting device emits light. In the case that the flexible circuit board is bonded to the second pad group 04, the flexible circuit board applies electrical signals to the drive chip via the second pad group 04, such that the drive chip functions normally.

The non-display region 0*b* in the display panel 00 further includes a third pad group 05. One portion of pads in the third pad group 05 are disposed on one side of the second pad group 04, and the other portion of the pads in the third pad group 05 are disposed on the other side of the second pad group 04. One end of the touch signal lead 02 herein is electrically connected to the touch unit within the display region 0*a*, and the other end of the touch signal lead 02 is electrically connected to the pads in the third pad group 05. The third pad group 05 is also configured to be electrically connected to the flexible circuit board. In this way, in the case that the flexible circuit board is bonded to the third pad group 05, a touch chip on the flexible circuit board applies touch electrical signals to the touch unit via the third pad group 05 and the touch signal lead 02, such that the touch unit in the display panel 00 functions normally.

However, a region, where the touch signal leads 02 are disposed, in the non-display region 0*b* and a region, where the data signal leads 01 are disposed, in the non-display region are on a same side of the display region 0*a*. Therefore, for arrangement of the plurality of touch signal leads 02 and the plurality of data signal leads 01 within the non-display region 0*b*, a width W of the region for deploying the plurality of touch signal leads 02 and the plurality of data signal leads 01 in the non-display region 0*b* is large. That is, the width W of a bottom frame of the display panel 00 is large. For example, the width W of the bottom frame of the display panel 00 is 3 cm.

Moreover, the third pad group 05 is disposed on two sides of the second pad group 04, and the second pad group 04 and the third pad group 05 need to be simultaneously bonded to the flexible circuit board. Therefore, in the process of bonding the flexible circuit board to the display panel 00, the number of pads between the flexible circuit board and the display panel 00 is large, and on the premise that a total length of the region, where the touch signal leads 02 and the data signal leads 01 are disposed, in the non-display region 0*b* is constant, a width of each of the pads is small and a distance between any two adjacent pads is small. For example, in the second pad group 04 and the third pad group 05, the width of each of the pads is 50 μm and the distance between any two adjacent pads is 50 μm. In this way, in the process of bonding the flexible circuit board to the display panel 00, due to the small width of each of the pads and the small distance between any two adjacent pads, it is probable that the pads in the flexible circuit board and the pads within the display panel 00 are misaligned, such that a poor bonding effect is achieved between the flexible circuit board and the display panel 00, and thus the display panel 00 achieves a poor display effect.

Figure 2:
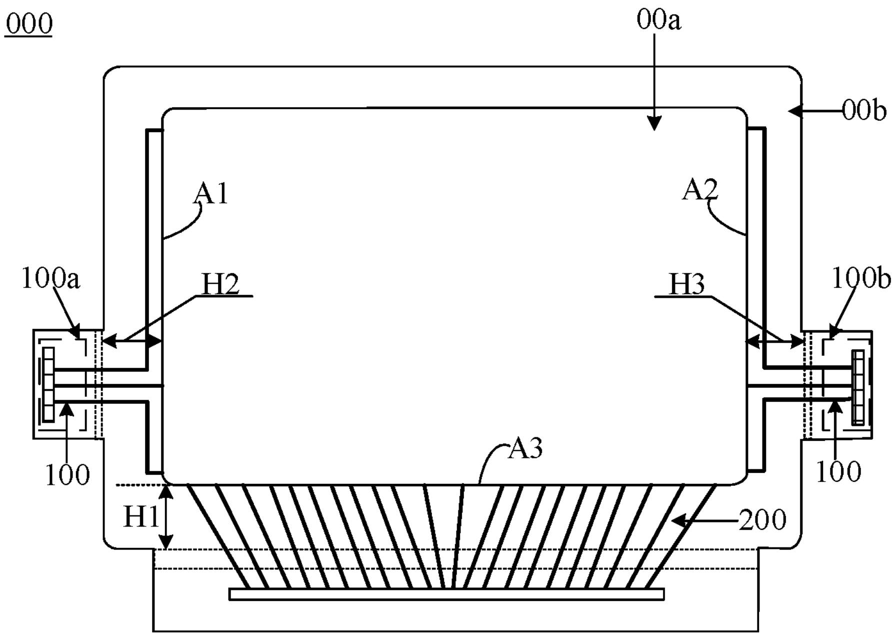
FIG. 2 is a top view of a display panel according to some embodiments of the present disclosure.

FIG. 2 is a top view of a display panel according to some embodiments of the present disclosure. Referring to FIG. 2, the display panel 000 is provided with a display region 00*a* and a non-display region 00*b* disposed on a periphery of the display region 00*a*.

The display panel 000 includes: a plurality of touch units (not illustrated in FIG. 2) and a plurality of light-emitting devices (not illustrated in FIG. 2) that are within the display region 00*a*, and a plurality of touch signal leads 100 and a plurality of data signal leads 200 that are within the non-display region 00*b*. The touch signal lead 100 is electrically connected to the touch unit, and the data signal lead 200 is electrically connected to the light-emitting device. The display panel 000 herein applies electrical signals to the plurality of touch units within the display region 00*a* over the plurality of touch signal leads 100, such that the plurality of touch units in the display panel 00 functions normally, and thus the display panel 000 implements a touch function. The display panel 000 applies electrical signals to the light-emitting devices within the display region 00*a* over the plurality of data signal leads 200, such that the light-emitting devices in the display panel 00 emit light, and thus the display panel 000 implements a display function.

In the non-display region 00*b*, a region where at least a portion of the touch signal leads 100 are disposed and a region where the plurality of data signal leads 200 are disposed are respectively on different sides of the display region 00*a*. A side of the display region 00*a* herein refers to a position of a side of the display region.

It should be noted that, in the embodiments of the present disclosure, illustrative descriptions are only given using a scenario in which the region, where all of the touch signal leads 100 are disposed, in the non-display region 00*b* and the region, where all of the data signal leads 200 are disposed, in the non-display region 00*b* are respectively on different sides of the display region 00*a*. In other optional implementations, the region where one portion of the plurality of touch signal leads 100 are disposed and the region where the plurality of data signal leads 200 are disposed are on a same side of the display region 00*a*; and the region where the other portion of the plurality of touch signal leads 100 are disposed and the region where the plurality of data signal leads 200 are disposed are on different sides of the display region 00*a*, which are not limited herein.

In some embodiments of the present disclosure, in the non-display region, the region where at least a portion of the touch signal leads 100 are disposed and the region where the plurality of data signal leads 200 are disposed are respectively on different sides of the display region 00*a*. Therefore, there is no need to arrange a large number of touch signal leads 100 in the region, where the plurality of data signal leads 200 are disposed, in the non-display region 00*b*. In this way, in the case that the plurality of data signal leads 200 are arranged in a pattern of converging from both sides to the middle, the region, where the plurality of data signal leads 200 are arranged, in the non-display region 00*b* is small, such that a width H1 (i.e., a width of a bottom frame of the display panel 000) of the region, where the plurality of data signal leads 200 are arranged, in the non-display region 00*b* is small.

In summary, the display panel according to some embodiments of the present disclosure includes: the plurality of touch units, the plurality of light-emitting devices, the plurality of touch signal leads, and the plurality of data signal leads. In the non-display region, the region where at least a portion of the touch signal leads are disposed and the region where the plurality of data signal leads are disposed are respectively on different sides of the display region. Therefore, there is no need to arrange a large number of touch signal leads in the region, where the plurality of data signal leads are disposed, in the non-display region. In this way, in the case that the plurality of data signal leads are arranged in a pattern of converging from both sides to the middle, the region, where the plurality of data signal leads are arranged, in the non-display region is small, such that the width H1 of the region, where the plurality of data signal leads are arranged, in the non-display region is small. That is, the width of the bottom frame of the display panel is small.

In some embodiments of the present disclosure, as illustrated in FIG. 2, the plurality of touch signal leads 100 includes: a first lead group 100*a* and a second lead group 100*b*. Both the first lead group 100*a* and the second lead group 100*b* include at least two of the touch signal leads 100.

In the non-display region 00*b*, a region where the first lead group 100*a* is disposed and a region where the second lead group 100*b* is disposed are respectively on a first side A1 and a second side A2 of the display region 00. The first side A1 and the second side A2 herein are two sides of the display region 00*a* opposite to each other or two sides of the display region 00*a* adjacent to each other, which is not limited herein. In this way, the region where the first lead group 100*a* is disposed and the region where the second lead group 100*b* is disposed are respectively on the first side A1 and the second side A2 of the display region 00*a*, and therefore, the plurality of touch signal leads 100 are not all disposed on one side of the display region 00*a*, such that both a width H2 of a region, adjacent to the first side A1 of the display region 00*a*, in the non-display region 00*b* and a width H2 of a region, adjacent to the second side A2 of the display region 00*b*, in the non-display region 0 are not too large. In this way, a screen-to-body ratio of the display panel 000 is effectively increased, and thus the display panel 000 achieves a better display effect.

In some embodiments of the present disclosure, in the case that the first side A1 of the display region 00*a* is arranged opposite to the second side A2 of the display region 00*a*, the region, where the plurality of data signal leads 200 are disposed, in the non-display region 00*b* is on a third side A3 of the display region 00*a*, wherein the third side A3 is between the first side A1 and the second side A2. In this way, in the case that the number of touch signal leads 100 in the first lead group 100*a* and the number of touch signal leads 100 in the second lead group 100*b* are equal, the width H2 of the region, adjacent to the first side A1 of the display region 00*a*, in the non-display region 00*b* is equal to the width H3 of the region, adjacent to the second side A2 of the display region 00*a*, in the non-display region 00*b*. Herein, the width of the region, adjacent to the first side A1 of display region 00*a*, in the non-display region 00*b* is a width of a left frame of the display panel 000, and the width, of the region, adjacent to the second side A2 of display region 00*a*, in non-display region 00*b* is a width of a right frame of the display panel 000. Therefore, in the case that the number of touch signal leads 100 in the first lead group 100*a* is equal to the number of touch signal leads 100 in the second lead group 100*b*, the width of the left frame of the display panel 000 is ensured to be equal to the width of the right frame, such that a viewing angle effect of a front side of the display panel 000 is great. In some optional embodiments, in the case that the region where all of the touch signal leads 100 are disposed and the region where the plurality of data signal leads 200 are disposed are on different sides of the display region 00*a*, the width H1 of a region, adjacent to the third side A3 of the display region 00*a* in the non-display region 00*b* (i.e., the width of the bottom frame of the display panel) is ensured to be small, such that the width of the left frame, the width of the right frame, and the width of the bottom frame of the display panel 000 are equal, and thus the viewing angle effect of the front side of the display panel 000 is further improved.

Figure 3:
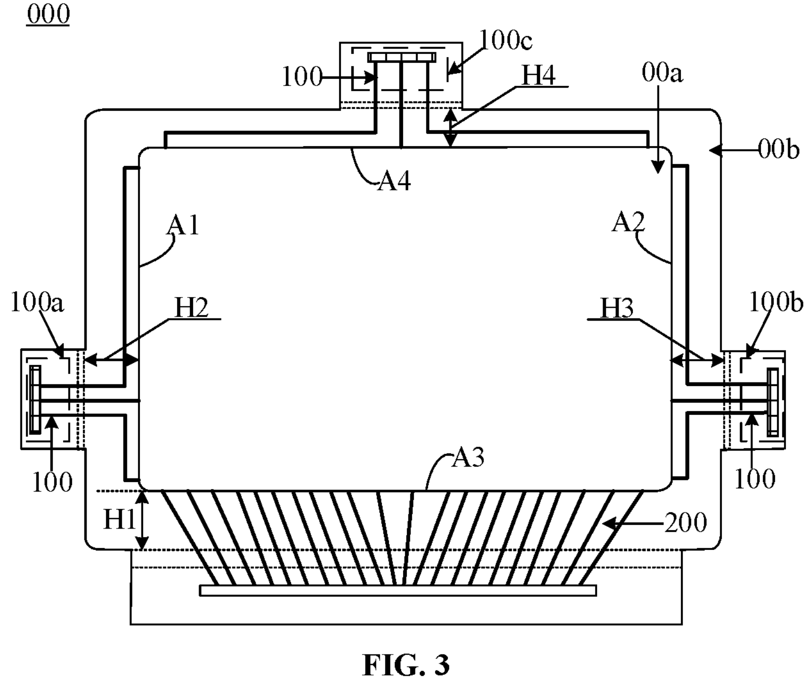
FIG. 3 is a top view of another display panel according to some embodiments of the present disclosure.

FIG. 3 is a top view of another display panel according to some embodiments of the present disclosure. Referring to FIG. 3, in some embodiments of the present disclosure, the plurality of touch signal leads 100 further include a third lead group 100*c*. The third lead group 100*c* includes at least two of the touch signal leads 100.

A region, where the third lead group 100*c* is disposed, in the non-display region 00*b* is on a fourth side A4 of the display region 00*a*, and the fourth side A4 is arranged opposite to the third side A3. A width of the region where the third lead group 100*c* is disposed is a width H4 of a region, adjacent to the fourth side A4 of the display region 00*a*, in the non-display region 00*b* (i.e., a width of an upper frame of the display panel). The region where the third lead group 100*c* is disposed is on the fourth side A4 of the display region 00*a*, and the third lead group 100*c* includes at least two of the touch signal leads 100. Therefore, the number of touch signal leads 100 in the first lead group 100*a* and the number of touch signal leads 100 in the second lead group 100*b* are less, such that both the width H2, of the region, adjacent to the first side A1 of the display region 00*a*, in the non-display region 00*b* and the width H3, of the region, adjacent to the first side A2 of the display region 00*a*, in the non-display region 00*b* are small. Accordingly, in the case that the number of touch signal leads 100 in the first lead group 100*a*, the number of touch signal leads 100 in the second lead group 100*b*, and the number of touch signal leads 100 in the third lead group 100*c* are equal, the width of the left frame, the width of the right frame, and the width of the upper frame of the display panel 000 are made equal, such that the display panel 000 exerts the better viewing angle effect on the front side. In some optional embodiments, in the case that the region where all of the touch signal leads 100 are disposed and the region where the plurality of data signal leads 200 are disposed are on different sides of the display region 00*a*, the width of the bottom frame of the display panel 000 is ensured to be small, and thus the width of the left frame, the width of the right frame, the width of the upper frame, and the width of the bottom frame of the display panel 000 are equal, which further improves the viewing angle effect of the front side of the display panel 000.

Figure 4:
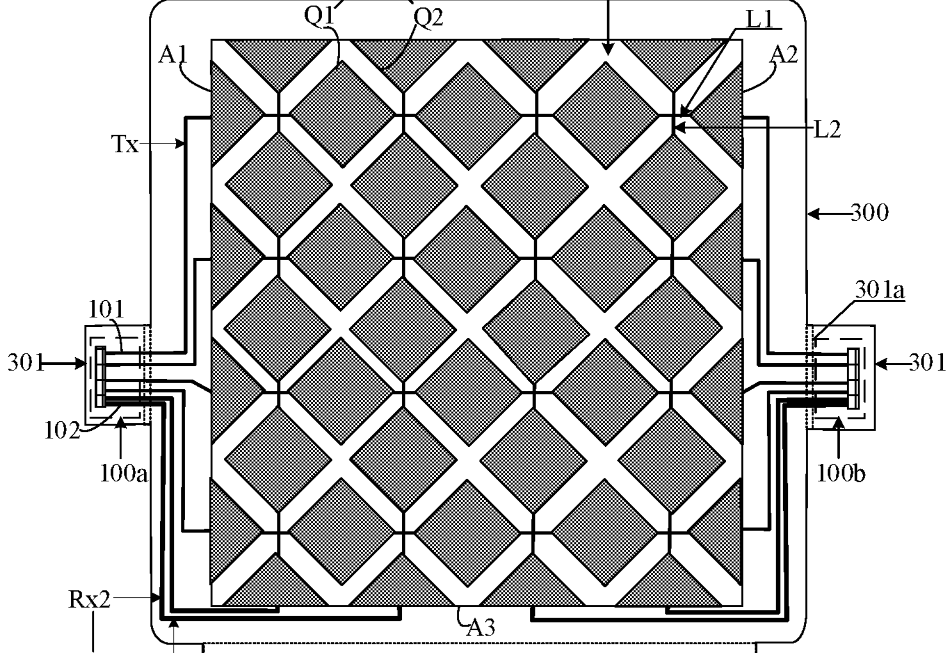
FIG. 4 is a schematic structural diagram of a touch unit and a display panel according to some embodiments of the present disclosure.

FIG. 4 is a schematic structural diagram of a touch unit and a display panel according to some embodiments of the present disclosure. Referring to FIG. 4, in some embodiments of the present disclosure, the touch unit Q includes a touch drive electrode Q1 and a touch sensing electrode Q2 that are insulated from each other.

In the plurality of touch signal leads 100, one portion of touch signal leads 100 are first sub-leads 101 configured to be electrically connected to the touch drive electrodes Q1, and the other portion of touch signal leads 100 are second sub-leads 102 configured to be electrically connected to the touch sensing electrodes Q2.

In some embodiments of the present disclosure, the display panel 000 further includes a touch drive signal line Tx electrically connected to the touch drive electrode Q1 and the first sub-lead 101, and a touch sensing signal line Rx electrically connected to the touch sensing electrode Q2 and the second sub-lead 102. In the display panel 000, both the number of touch drive electrodes Q1 and the number of touch sensing electrodes Q2 are both plural.

The plurality of touch drive electrodes Q1 are arranged in a plurality of rows, and each of the touch drive electrodes Q1 in each row of touch drive electrodes Q1 are successively connected in series, for example, any two adjacent touch drive electrodes Q1 in a row of touch drive electrodes Q1 are electrically connected by a first signal line L1. A row of touch drive electrodes Q1 is electrically connected to a first end of one of the touch drive signal lines Tx, and a second end of this touch drive signal line Tx is electrically connected to one of the first sub-leads 101.

The plurality of touch sensing electrodes Q2 are arranged in a plurality of columns, and each of the touch sensing electrodes Q2 in each column of touch sensing electrodes Q2 are successively connected in series, for example, any two adjacent touch sensing electrodes Q2 in a column of touch sensing electrodes Q2 are electrically connected by a second signal line L2. A column of touch sensing electrodes Q2 is electrically connected to a first end of one of the touch sensing signal lines Rx, and a second end of this touch sensing signal line Rx is electrically connected to one of the second sub-leads 102.

It should be noted that the touch drive electrode Q1 and the touch sensing electrode Q2 in the touch unit Q are arranged in a same layer and made of a same material, one of the first signal lines L1 and the second signal line L2 is arranged in the same layer and made of the same material as the touch drive electrode Q1, and the other requires to be employed as a bridge signal line and arranged in a different layer from the touch drive electrode Q1. Two conductive structures being arranged in different layers according to some embodiments of the present disclosure herein indicates that: an insulation layer is present between two conductive layers where the two conductive structures are disposed. For example, an insulation layer is present between the bridge signal line and the touch drive electrode Q1.

It should be further noted that the display panel 000 applies touch signals to the touch drive electrode Q1 over the touch drive signal line Tx, such that the touch drive electrode Q1 functions normally. In the case that the user touches the display panel 000, the display panel 000 senses, by the touch sensing electrode Q2 and the touch sensing signal line Rx, position information of a region where the user touches the display panel 000. In this way, the display panel 000 is capable of locating the position where the user touches the display panel 000.

In some embodiments of the present disclosure, among the plurality of touch drive signal lines Tx, a portion of the touch drive signal lines Tx are within a region, proximal to the first side A1, in the non-display region 00*b*, and another portion of the touch drive signal lines Tx are within a region, proximal to the second side A2, in the non-display region 00*b*. The touch drive signal lines Tx within the region, proximal to the first side A1, in the non-display region 00*b* are configured to be connected to the touch drive electrodes Q1 proximal to the first side A1 within the display region 00*a*. That is, the touch drive signal lines Tx within the region, proximal to the first side A1, in the non-display region 00*b* are capable of controlling the plurality of touch drive electrodes Q1 proximal to the first side A1 within the display region 00*a*. In this way, a length of the touch drive signal line Tx within the region, proximal to the first side A1, in the non-display region 00*b* is effectively shortened, and a resistance of the touch drive signal line Tx in the display panel 000 is reduced, such that a touch effect of the display panel 000 is improved. The touch drive signal lines Tx within the region, proximal to the second side A2, in the non-display region 00*b* are configured to be connected to the touch drive electrodes Q1 proximal to the second side A2 within the display region 00*a*. That is, the touch drive signal lines Tx within the region, proximal to the second side A2, in the non-display region 00*b* are capable of controlling the plurality of touch drive electrodes Q1 proximal to the second side A2 within the display region 00*a*. In this way, a length of the touch drive signal line Tx within the region, proximal to the second side A2, in the non-display region 00*b* is effectively shortened, and the resistance of the touch drive signal line Tx in the display panel 000 is reduced, such that the touch effect of the display panel 000 is improved.

In some embodiments of the present application, among the plurality of touch sensing signal lines Rx, each of at least a portion of the touch sensing signal lines Rx includes a first line segment Rx1 and a second line segment Rx2 that are electrically connected to each other. The first line segment Rx1 is within a region, proximal to the third side A3, in the non-display region 00*b*, and the second line segment Rx2 is within a region, proximal to the first side A1 or the second side A2, in the non-display region 00*b*. The plurality of touch sensing signal lines Rx herein are divided into two portions: a portion of the touch sensing signal lines Rx are configured to be connected to the touch sensing electrodes Q2 proximal to the first side A1 within the display region 00*a*, and the other portion of the touch sensing signal lines Rx are configured to be connected to the touch sensing electrodes Q2 proximal to the second side A2 within the display region 00*a*.

In some embodiments of the present disclosure, both the first lead group 100*a* and the second lead group 100*b* include the first sub-lead 101 and the second sub-lead 102. The second sub-lead 102 in the first lead group 100*a* controls, by the touch sensing signal line Rx, the touch sensing electrode Q2 proximal to the first side A1 within the display region 00*a*. In this way, a length of the touch sensing signal line Rx electrically connected to the first lead group 100*a* is effectively shortened, and thus a resistance of the touch sensing signal line Rx in the display panel 000 is reduced. The second sub-lead 102 in the second lead group 100*b* controls, by the touch sensing signal line Rx, the touch sensing electrode Q2 proximal to the second side A2 within the display region 00*a*. In this way, a length of the touch sensing signal line Rx electrically connected to the second lead group 100*b* is effectively shortened, and thus the resistance of the touch sensing signal line Rx in the display panel 000 is reduced.

Figure 5:
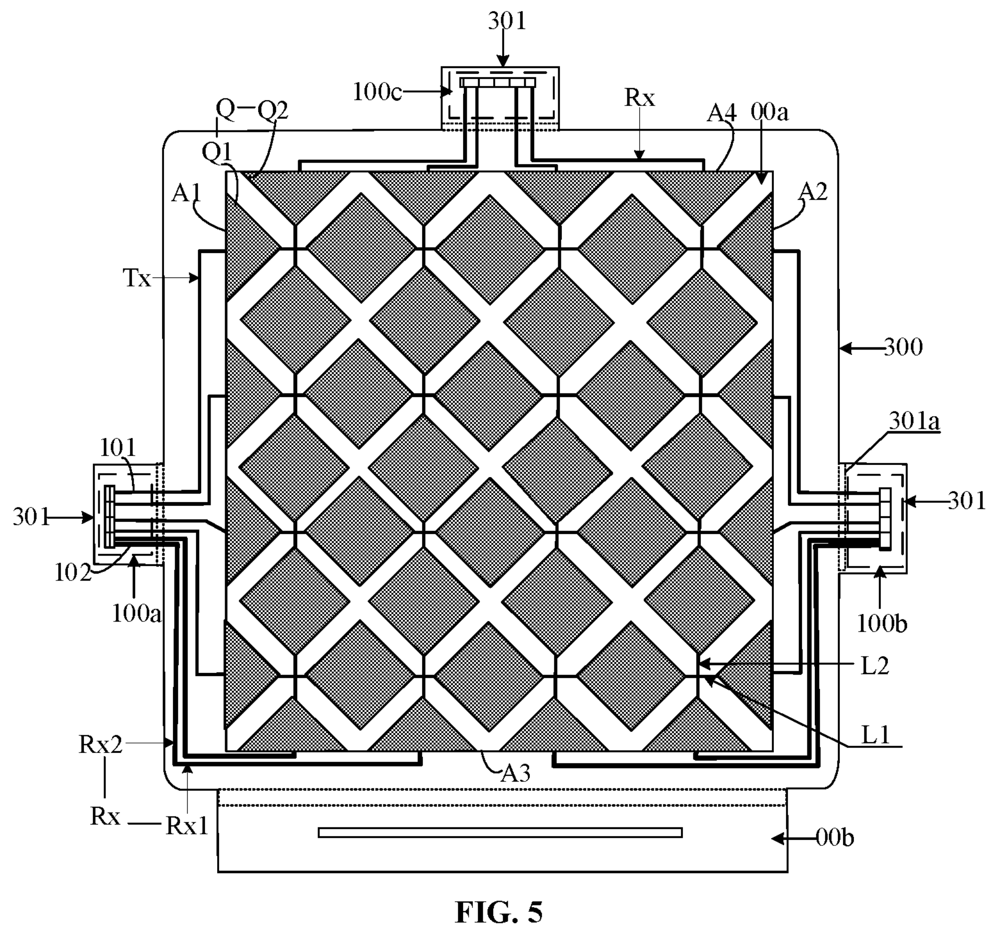
FIG. 5 is a schematic structural diagram of another touch unit and another display panel according to some embodiments of the present disclosure.

FIG. 5 is a schematic structural diagram of another touch unit and another display panel according to some embodiments of the present disclosure. Referring to FIG. 5, in some embodiments of the present disclosure, in the case that the plurality of touch sensing signal leads 100 include: the first lead group 100*a*, the second lead group 100*b*, and the third lead group 100*c*, among the plurality of touch sensing signal lines Rx, a portion of the touch sensing signal lines Rx include the first line segments Rx1 and the second line segments Rx2, and another portion of the touch sensing signal lines Rx are all within a region, proximal to the fourth side A4, in the non-display region 00*b*. In this way, the number of touch sensing signal lines Rx in the first lead group 100*a* and the second lead group 100*b* is further reduced, such that both the width H2 of the region, adjacent to the first side A1 of the display region 00*a*, in the non-display region 00*b*, and the width H3 of the region, adjacent to the second side A2 of the display region 00*a*, in the non-display region 00*b* are reduced, and thus the screen-to-body ratio of the display panel 000 is further improved.

In some embodiments of the present disclosure, referring to FIG. 4 and FIG. 5, the display panel 000 further includes a substrate 300. Both the light-emitting device and the touch unit Q are disposed on the substrate 300. The substrate 300 includes a first protrusion 301 for deploying the touch signal lead 100, and the first protrusion 301 includes a first bendable region 301*a*. The light-emitting device herein is more proximal to the substrate 300 than the touch unit Q, and the light-emitting device is insulated from the touch unit Q.

In the case that a portion, within the first bendable region 301*a*, of the first protrusion 301 is bent, a portion of the first protrusion 301 is disposed on a side, distal from the light-emitting device, of the substrate 300. In this way, the widths of the left frame, the right frame, and the upper frame of the display panel 000 are reduced by bending the display panel 000, such that the screen-to-body ratio of the display panel 000 is higher.

Figure 6:
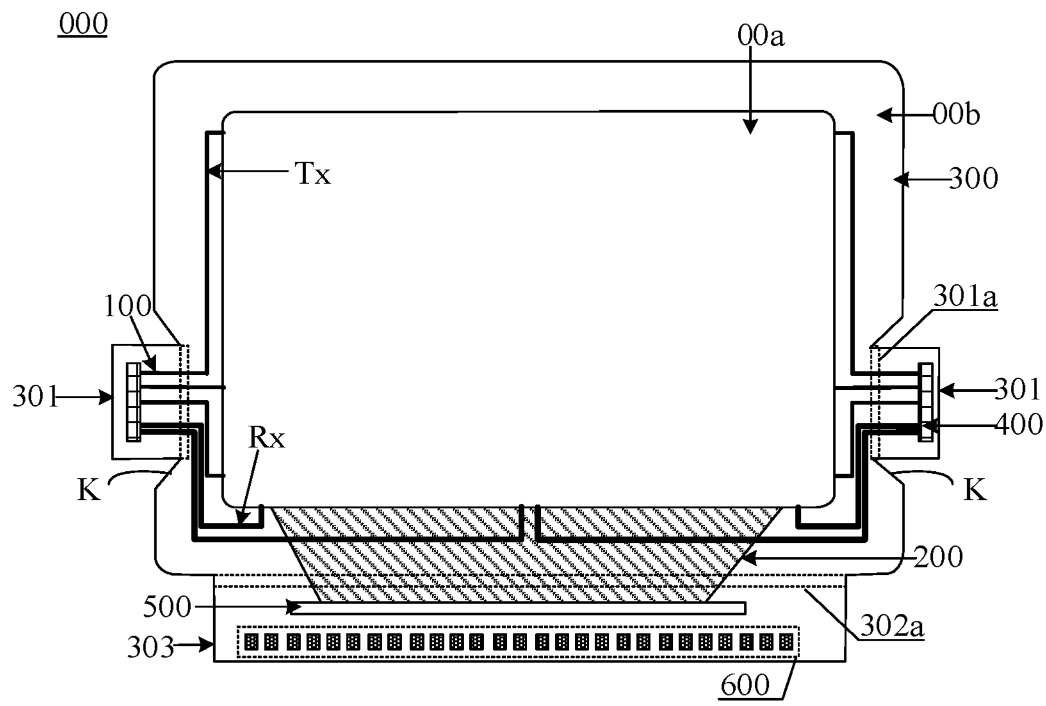
FIG. 6 is a top view of still another display panel according to some embodiments of the present disclosure.

FIG. 6 is a top view of still another display panel according to some embodiments of the present disclosure. Referring to FIG. 6, in some embodiments of the present disclosure, a portion, within the non-display region 00*b*, of the substrate 300 includes a hollowed-out structure K, and at least a portion of the first bendable region 301*a* is within the hollowed-out structure K. Because at least a portion of the first bendable region 301*a* is within the hollowed-out structure K, a distance between the first bendable region 301*a* and the display region 00*a* is small. That is, in the case that the non-display region 00*b* of the display panel 000 is bent, a large portion of the first protrusion 301 is disposed on the side, distal from the light-emitting device, of the substrate 300. In this way, a width of the non-display region 00*b* is reduced, such that the screen-to-body ratio of the display panel 000 is higher.

It should be noted that, FIG. 6 illustrates the scenario where the hollowed-out structure K is arranged within the region, adjacent to the first side A1 of the display region 00*a*, in the non-display region 00*b*, and within the region, adjacent to the second side A2 of the display region 00*a*, in the non-display region 00*b*. In other possible implementations, the hollowed-out structure K may be arranged within the region, adjacent to the fourth side A4 of the display region 00*a*, in the non-display region 00*b*, which is not limited herein.

It should be further noted that, widths of other signal wirings (e.g., power supply signal wirings) in the display panel 000 in a region between the first bendable region 301*a* and the display region 00*a* may be suitably reduced, such that the hollowed-out structure K is arranged within the non-display region 00*b*.

Figure 7:
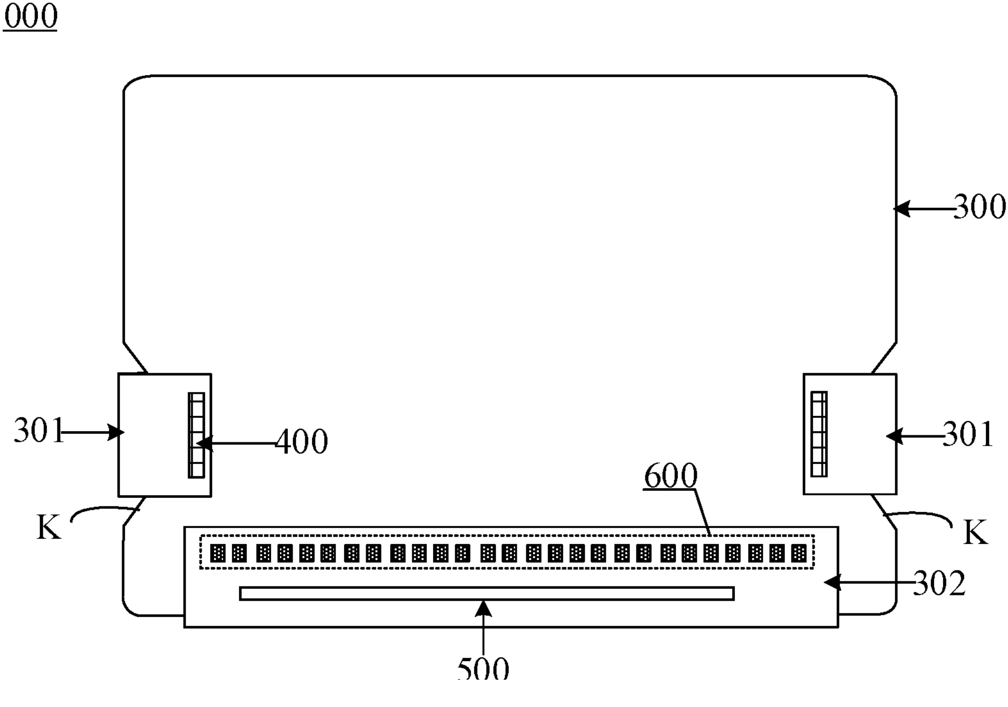
FIG. 7 is a bottom view of a bent display panel according to some embodiments of the present disclosure.

FIG. 7 is a bottom view of a bent display panel according to some embodiments of the present disclosure. Referring to FIG. 7, in the case that the portion, within the first bendable region 301*a*, of the first protrusion 301 is bent, an entirety of the bent first protrusion 301 is within the hollowed-out structure K. In this way, the width of the non-display region 00*b* is further reduced and the screen-to-body ratio of the display panel 000 is improved. For example, for a 14-inch display panel, in the case the hollowed-out structure K is not employed in the display panel 000, the width H2 of the region, adjacent to the first side A1 of the display region 00*a*, in the non-display region 00*b* is 2.5 mm, and the width H3 of the region, adjacent to the second side A2 of the display region 00*a*, in the non-display region 00*b* is 2.5 mm. In contrast, in the embodiments of the present disclosure, by employing the hollowed-out structure K, the width H2 of the region, adjacent to the first side A1 of the display region 00*a*, in the non-display region 00*b* is 2.0 mm, and the width H3 of the region, adjacent to the second side A2 of the display region 00*a*, in the non-display region 00*b* is 2.0 mm.

In some embodiments of the present disclosure, referring to FIG. 6, the display panel 000 further includes a first pad group 400 within the first protrusion 301. The first pad group 400 is disposed on a side, distal from the display region 00*a*, of the first bendable region 301*a*, and pads within the first pad group 400 are electrically connected to the touch signal leads 100 arranged within the first protrusion 301. The first pad group 400 herein is configured to be electrically connected to the flexible circuit board. In this way, in the case that the flexible circuit board is bonded to the first pad group 400, the flexible circuit board applies electrical signals to the touch signal lead 100 over the first pad group 400, such that the touch unit Q functions.

In some embodiments of the present disclosure, the substrate 300 further includes a second protrusion 302 for deploying the data signal leads 200. The second protrusion 302 includes a second bendable region 302*a*.

In the case that a portion, within the second bendable region 302*a*, of the second protrusion 302 is bent, a portion of the second protrusion 302 is disposed on the side, distal from the substrate 300, of the light-emitting device. In this way, the width of the bottom frame of the display panel 000 is reduced by bending the display panel 000, such that the screen-to-body ratio of the display panel 000 is higher.

It should be noted that, in the bottom frame region of the display panel 000*a*, portion of the data signal leads 200 and a portion of the touch signal leads 100 are overlapped with each other. To avoid a short circuit between the data signal lead 200 and the touch signal lead 100, the data signal lead 200 and the touch signal lead 100 are arranged in different layers.

In some embodiments of the present disclosure, as illustrated in FIG. 6, the display panel 000 further includes a second pad group 500 and a third pad group 600 that are within the second protrusion 302. Both the second pad group 500 and the third pad group 600 are disposed on a side, distal from the display region 00*a*, of the second bendable region 302*a*, and the second pad group 500 is more proximal to the display region 00*a* than the third pad group 600.

Pads in the second pad group 500 are electrically connected to the data signal leads 200 arranged within the second protrusion 302, and the pads in the second pad group 500 are electrically connected to pads in the third pad group 600. The second pad group 500 herein is configured to be electrically connected to the drive chip, and the third pad group 600 is configured to be electrically connected to the flexible circuit board. In this way, in the case that the drive chip is bonded to the second pad group 500, the drive chip applies electrical signals to the light-emitting device within the display region 00*a* over the second pad group 500 and the data signal lead 200, such that the light-emitting device emits light. In the case that the flexible circuit board is bonded to the third pad group 600, the flexible circuit board applies electrical signals to the drive chip over the third pad group 600, such that the drive chip functions.

In some embodiments of the present disclosure, because there is no need to arrange a large number of touch signal leads 200 in the region where the plurality of data signal leads 200 are disposed, the space to arrange the third pad group 600 within the second protrusion 302 is large. In this way, compared with some practices where the width of the pad and the distance between pads require to be reduced, in the display panel 000 according to some embodiments of the present disclosure, a width of the pad in the third pad group 600 is large, and a distance between the pads in the third pad group 600 is large. For example, the width of the pad in the third pad group 600 is 70 μm, and the distance between the pads in the third pad group 600 is 70 μm. In this way, in the process of bonding the flexible circuit board to the third pad group 600, a probability of the misalignment occurring between the pads in the flexible circuit board and the pads in the third pad group 600 is low, such that a better bonding effect is achieved between the flexible circuit board and the third pad group 600 is great, and thus the display panel 000 achieves a better display effect.

Figure 8:
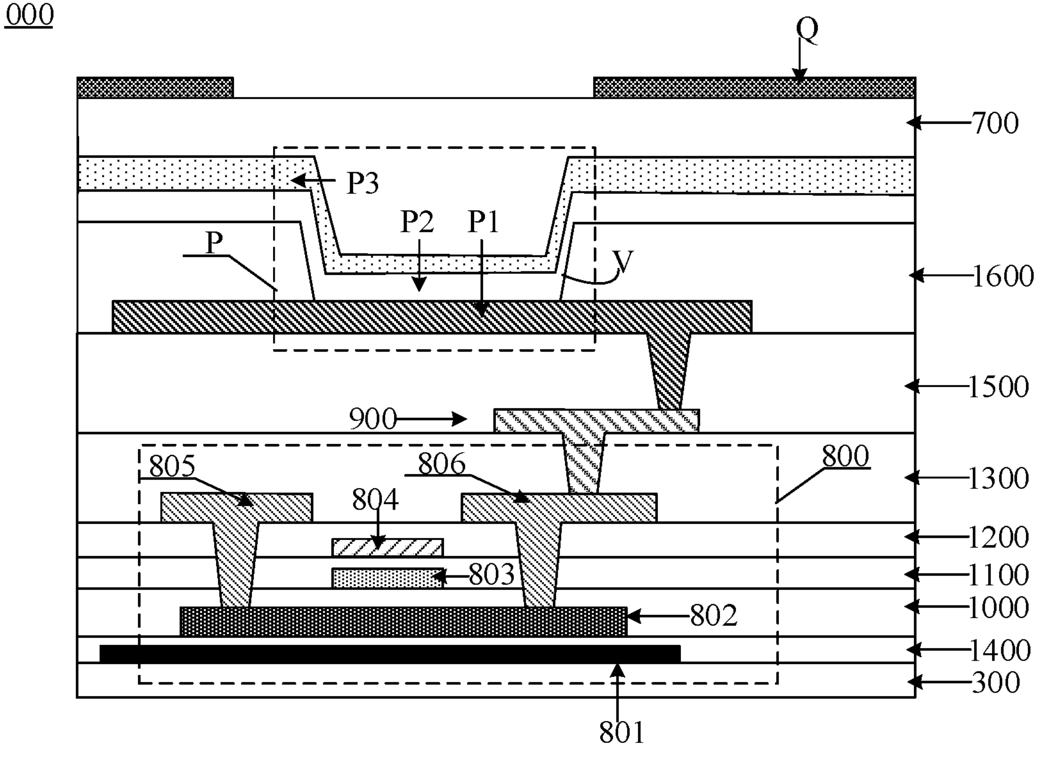
FIG. 8 is a schematic diagram of a film layer structure of a display panel according to some embodiments of the present disclosure.

FIG. 8 is a schematic diagram of a film layer structure of a display panel according to some embodiments of the present disclosure. In some embodiments of the present disclosure, referring to FIG. 8, the display panel 000 further includes a package layer 700 disposed on the substrate. The plurality of light-emitting devices are disposed on a side, proximal to the substrate 300, of the package layer 700, and the plurality of touch units Q are disposed on a side, distal from the substrate 300, of the package layer 700.

The display panel 000 further includes: a pixel drive circuit 800 and an interposer electrode 900 that are within the display region 00*a*. The pixel drive circuit 800 is more proximal to the substrate 300 in the display panel 000 than the light-emitting device P. The interposer electrode 900 is disposed between the pixel drive circuit 800 and the light-emitting device P and is electrically connected to the pixel drive circuit 800 and the light-emitting device P. In the case that the drive chip is bonded to the first pad group 400 within the display panel 000, the drive chip applies electrical signals to the light-emitting device P over the pixel drive circuit 800, such that the light-emitting device P emits light, and thus the display panel 000 displays images.

The number of pixel drive circuits 800 in the display panel 000 is a plurality. Each of the pixel drive circuits 800 includes: a light-shielding layer 801, an active layer 802, a first gate electrode 803, a second gate electrode 804, a source electrode 805, and a drain electrode 806. The active layer 802 is insulated from the first gate electrode 803 by a first gate insulation layer 1000, the first gate electrode 803 is insulated from the second gate electrode 804 by a second gate insulation layer 1100, and the active layer 802 is electrically connected to the source electrode 805 and the drain electrode 806. Typically, the source electrode 805 and the drain electrode 806 are arranged in a same layer. That is, the source electrode 805 and the drain electrode 806 are a portion of a same conductive pattern. The conductive pattern in which the source electrode 805 and the drain electrode 806 are disposed is insulated from the second gate electrode 804 by a first insulation layer 1200.

It should be noted that, the active layer 802, the first gate electrode 803, the second gate electrode 804, the source electrode 805, and the drain electrode 806 form a thin-film transistor. The embodiments of the present disclosure give illustrative descriptions using a scenario where the thin-film transistor is a top-gate type thin-film transistor. In other optional implementations, the thin-film transistor is a bottom-gate type thin-film transistor, which is not limited herein.

One of the source electrode 805 and the drain electrode 806 is electrically connected to the light-emitting device P by the interposer electrode 1100. Exemplarily, the interposer electrode 1100 is insulated from the drain electrode 806 by a second insulation layer 1300. The plurality of pixel drive circuits 800 are electrically connected to the plurality of light-emitting devices P in one-to-one correspondence.

The light-shielding layer 801 is insulated from the active layer 802 by a third insulation layer 1400, and an orthographic projection of the active layer 802 on the substrate 300 is within an orthographic projection of the light-shielding layer 801 on the substrate 300. In this way, the active layer 802 is shielded by the light-shielding layer 801, such that a voltage threshold offset is avoided in the active layer 802 under the irradiation of light.

The light-emitting device P includes: a plurality of anode layers P1, light-emitting layers P2, and cathode layers P3 that are successively stacked. The light-emitting device P is an organic light-emitting display (OELD). Each of the pixel drive circuits 800 herein is electrically connected to the anode layer P1 of the corresponding light-emitting device P by the interposer electrode 900. Exemplarily, a first planarization layer 1500 is present between the interposer electrode 1100 and the anode layer P1.

The display panel 000 further includes a pixel definition layer 1600. A portion within the display region 00*a* of the pixel definition layer 1600 includes a plurality of pixel holes V. Within each of the pixel holes V, a portion within the pixel hole V of the anode layer P1, a portion within the pixel hole V of the light emitting layer P2, and a portion within the pixel hole V of the cathode layer P3 are capable of forming one of the light-emitting devices P.

The package layer 700 includes: a first inorganic package layer, an organic package layer, and a second inorganic package layer that are successively stacked. The package layer 700 is configured to package the display panel 000 to avoid the light-emitting device P in the display panel 000 from being damaged by erosion of components such as moisture and oxygen in the air. In this way, the operation life of the light-emitting device P is effectively improved by the package layer 700.

In summary, the display panel according to some embodiments of the present disclosure includes: the plurality of touch units, the plurality of light-emitting devices, the plurality of touch signal leads, and the plurality of data signal leads. In the non-display region, the region where at least a portion of the touch signal leads are disposed and the region where the plurality of data signal leads are disposed are respectively on different sides of the display region. Therefore, there is no need to arrange a large number of touch signal leads in the region, where the plurality of data signal leads are disposed, in the non-display region. In this way, in the case that the plurality of data signal leads are arranged in a pattern of converging from both sides to the middle, the region where the plurality of data signal leads are arranged in the non-display region is small, such that the width H1 of the region, where the plurality of data signal leads are arranged, in the non-display region is small. That is, the width of the bottom frame of the display panel is small.

Some embodiments of the present disclosure further provide a display device. The display device is a smartphone, a tablet computer, a television, a display, a notebook computer, a digital photo frame, a navigator, and any other product with a display function. The display panel includes: a power supply component and a display panel, wherein the power supply component is configured to supply power to the display panel.

In some embodiments of the present disclosure, the display panel is an OLED display panel or an active matrix organic light emitting diode (AM-OLED) display panel. For example, the display panel is the display panel as illustrated in FIG. 2, FIG. 4, FIG. 5, FIG. 6, FIG. 7, FIG. 9, FIG. 10, FIG. 11, or FIG. 13 in the above embodiments.

It should be noted that in the accompanying drawings, sizes of layers and regions may be exaggerated for clearer illustration. It should be understood that where an element or layer is referred to as being "on" another element or layer, the element or layer may be directly on another element, or intervening layers therebetween may be present. In addition, it should be understood that where an element or layer is referred to as being "under" another element or layer, the element or layer may be directly under the other element, or there may be more than one intervening layer or element. In addition, it may be further understood that in the case that a layer or element is referred to as being "between" two layers or two elements, the layer may be the only layer between the two layers or two elements, or more than one intervening layer or element may further be present. Similar reference numerals indicate similar elements throughout.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A display panel, being divided into a display region and a non-display region disposed on a periphery of the display region, wherein the display panel comprises:

a plurality of touch units and a plurality of light-emitting devices that are within the display region; and a plurality of touch signal leads and a plurality of data signal leads that are within the non-display region, wherein the touch signal lead is electrically connected to the touch unit, and the data signal lead is electrically connected to the light-emitting device;

wherein in the non-display region, a region where at least a portion of the touch signal leads are disposed and a region where the plurality of data signal leads are disposed are respectively on different sides of the display region; and the display panel further comprises a substrate, wherein the light-emitting device and the touch unit are disposed on the substrate, and the substrate comprises a plurality of first protrusions for deploying the touch signal leads, wherein the plurality of first protrusions comprises a first protrusion disposed on a left side of the display panel, a first protrusion disposed on a right side of the display panel, a first protrusion disposed on an upper side of the display panel, and each first protrusion comprises a first bendable region; wherein in a case that a portion, within the first bendable region, of the first protrusion is bent, a portion of the first protrusion is on a side, distal from the light-emitting device, of the substrate, widths of a left frame, a right frame, and an upper frame of the display panel are reduced, and the display panel has a higher screen-to-body ratio.

2. The display panel according to claim 1, wherein the plurality of touch signal leads comprise: a first lead group and a second lead group, both the first lead group and the second lead group comprising at least two of the touch signal leads;

wherein in the non-display region, a region where the first lead group is disposed and a region where the second lead group is disposed are respectively on a first side and a second side of the display region.

3. The display panel according to claim 2, wherein the first side of the display region and the second side of the display region are opposite to each other; and the region, where the plurality of data signal leads are disposed, in the non-display region is on a third side of the display region, the third side being between the first side and the second side.

4. The display panel according to claim 3, wherein the plurality of touch signal leads further comprise: a third lead group, the third lead group comprising at least two of the touch signal leads;

wherein a region, where the third lead group is disposed, in the non-display region is on a fourth side of the display region, the fourth side being opposite to the third side.

5. The display panel according to claim 1, wherein the touch unit comprises: a touch drive electrode and a touch sensing electrode that are insulated from each other;

wherein a portion of the plurality of touch signal leads are first sub-leads configured to be electrically connected to the touch drive electrodes, and another portion of the plurality of touch signal leads are second sub-leads configured to be electrically connected to the touch sensing electrodes.

6. The display panel according to claim 5, further comprising: a touch drive signal line electrically connected to the touch drive electrode and the first sub-lead, and a touch sensing signal line electrically connected to the touch sensing electrode and the second sub-lead; wherein one portion of the touch drive signal lines are within a region, proximal to the first side, in the non-display region, and the other portion of the touch drive signal lines are within a region, proximal to the second side, in the non-display region;

each of at least a portion of the touch sensing signal lines comprises a first line segment and a second line segment that are electrically connected to each other, wherein the first line segment is within a region, proximal to the third side, in the non-display region, and the second line segment is within the region, proximal to the first side or the second side, in the non-display region; and both the first lead group and the second lead group comprise: the first sub-lead and the second sub-lead.

7. The display panel according to claim 6, wherein in a case that the plurality of touch signal leads comprise the first lead group, the second lead group, and the third lead group, each of one portion of the touch sensing signal lines comprises the first line segment and the second line segment, and the other portion of the touch sensing signal lines are within a region, proximal to the fourth side, in the display region;

wherein each of the touch signal leads in the third lead group is the second sub-lead.

8. The display panel according to claim 1, wherein a portion, within the non-display region, of the substrate comprises a hollowed-out structure, at least a portion of the first bendable region being within the hollowed-out structure.

9. The display panel according to claim 8, wherein in the case that the portion, within the first bendable region, of the first protrusion is bent, the first protrusion is entirely within the hollowed-out structure.

10. The display panel according to claim 1, further comprising: a first pad group within the first protrusion, wherein the first pad group is disposed on a side, distal from the display region, of the first bendable region, and pads in the first pad group are electrically connected to the touch signal leads within the first protrusion.

11. The display panel according to claim 1, wherein the substrate further comprises a second protrusion for deploying the data signal lead, the second protrusion comprising a second bendable region;

wherein in a case that a portion, within the second bendable region, of the second protrusion is bent, a portion of the second protrusion is on the side, distal from the light-emitting device, of the substrate.

12. The display panel according to claim 11, further comprising: a second pad group and a third pad group that are within the second protrusion, wherein both the second pad group and the third pad group are disposed on a side, distal from the display region, of the second bendable region, and the second pad group is more proximal to the display region relative to the third pad group;

wherein pads in the second pad group are electrically connected to the data signal leads within the second protrusion, and the pads in the second pad group are electrically connected to pads in the third pad group.

13. The display panel according to claim 8, further comprising: a package layer disposed on the substrate, wherein the plurality of light-emitting devices are disposed on a side, proximal to the substrate, of the package layer, and the plurality of touch units are disposed on a side, distal from the substrate, of the package layer.

14. A display device, comprising a power supply component and a display panel;

wherein the display panel is divided into a display region and a non-display region disposed on a periphery of the display region, and the display panel comprises:

a plurality of touch units and a plurality of light-emitting devices that are within the display region; and a plurality of touch signal leads and a plurality of data signal leads that are within the non-display region, wherein the touch signal lead is electrically connected to the touch unit, and the data signal lead is electrically connected to the light-emitting device;

wherein in the non-display region, a region where at least a portion of the touch signal leads are disposed and a region where the plurality of data signal leads are disposed are respectively on different sides of the display region;

the display panel further comprises a substrate, wherein the light-emitting device and the touch unit are disposed on the substrate, and the substrate comprises a plurality of first protrusions for deploying the touch signal leads, wherein the plurality of first protrusions comprises a first protrusion disposed on a left side of the display panel, a first protrusion disposed on a right side of the display panel, a first protrusion disposed on an upper side of the display panel, and each first protrusion comprises a first bendable region; wherein in a case that a portion, within the first bendable region, of the first protrusion is bent, a portion of the first protrusion is on a side, distal from the light-emitting device, of the substrate, widths of a left frame, a right frame, and an upper frame of the display panel are reduced, and the display panel has a higher screen-to-body ratio; and the power supply component is configured to supply power to the display panel.

15. The display device according to claim 14, wherein the plurality of touch signal leads comprise: a first lead group and a second lead group, both the first lead group and the second lead group comprising at least two of the touch signal leads;

wherein in the non-display region, a region where the first lead group is disposed and a region where the second lead group is disposed are respectively on a first side and a second side of the display region.

16. The display device according to claim 15, wherein the first side of the display region and the second side of the display region are opposite to each other; and the region, where the plurality of data signal leads are disposed, in the non-display region is on a third side of the display region, the third side being between the first side and the second side.

17. The display device according to claim 16, wherein the plurality of touch signal leads further comprise: a third lead group, the third lead group comprising at least two of the touch signal leads;

wherein a region, where the third lead group is disposed, in the non-display region is on a fourth side of the display region, the fourth side being opposite to the third side.

18. The display device according to claim 14, wherein the touch unit comprises: a touch drive electrode and a touch sensing electrode that are insulated from each other;

wherein a portion of the plurality of touch signal leads are first sub-leads configured to be electrically connected to the touch drive electrodes, and another portion of the plurality of touch signal leads are second sub-leads configured to be electrically connected to the touch sensing electrodes.

19. The display device according to claim 18, wherein the display panel further comprises: a touch drive signal line electrically connected to the touch drive electrode and the first sub-lead, and a touch sensing signal line electrically connected to the touch sensing electrode and the second sub-lead; wherein one portion of the touch drive signal lines are within a region, proximal to the first side, in the non-display region, and the other portion of the touch drive signal lines are within a region, proximal to the second side, in the non-display region;

each of at least a portion of the touch sensing signal lines comprises a first line segment and a second line segment that are electrically connected to each other, wherein the first line segment is within a region, proximal to the third side, in the non-display region, and the second line segment is within the region, proximal to the first side or the second side, in the non-display region; and both the first lead group and the second lead group comprise: the first sub-lead and the second sub-lead.

* * * * *